Aug. 14, 1945.  W. A. SCHULZE  2,382,505
OLEFIN RECOVERY PROCESS
Filed Oct. 5, 1942
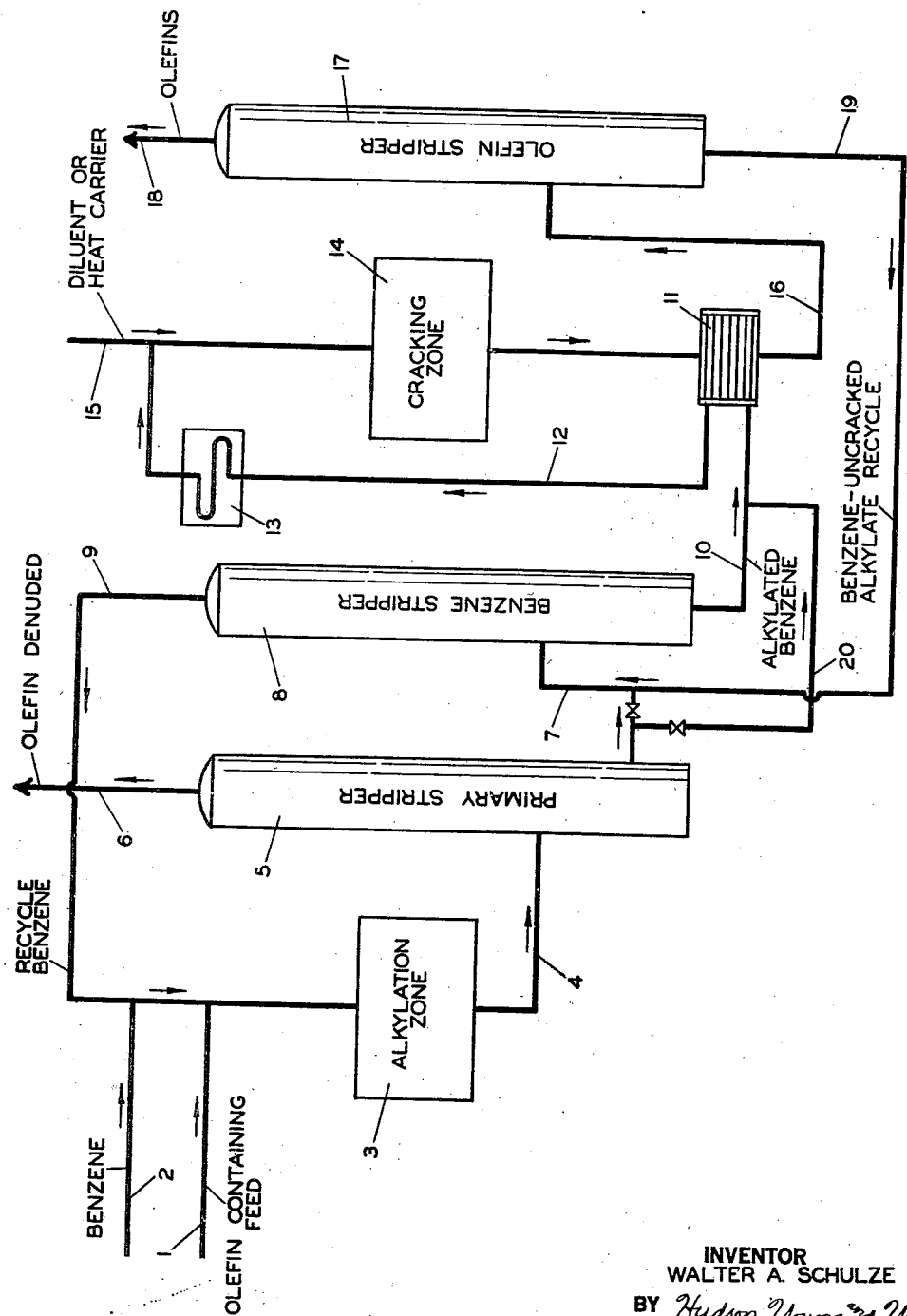
INVENTOR
WALTER A. SCHULZE
BY Hudson, Young and Yinger
ATTORNEYS Patented Aug. 14, 1945

2,382,505

UNITED STATES PATENT OFFICE 2,382,505

OLEFIN RECOVERY PROCESS

Walter A. Schulze, Bartlesville, Okla., assignor to Phillips Petroleum Company, a corporation of Delaware Application October 5, 1942, Serial No. 460,846

5 Claims. (Cl. 260—677)

This invention relates to the treatment of hydrocarbon mixtures to segregate mono-olefinic compounds therefrom. More specifically the invention relates to the treatment of hydrocarbon fluids containing low-boiling olefins to effect selective removal of the olefins and to recover said olefins in the form of more valuable concentrates. Still more specifically the present invention embodies an improved method of separating and recovering valuable low-boiling olefins from paraffin-olefin mixtures in the concentrations desirable for such utilizations as polymerization, alkylation, dehydrogenation to diolefins, and many other syntheses of outstanding commercial interest.

In the various hydrocarbon syntheses and related processes utilizing olefin feed stocks it is nearly always desirable and in many cases necessary to employ the reactant olefins in reasonably concentrated form. The economic reasons for the use of such concentrates are usually obvious and include the scaling down of equipment size, handling smaller volumes of raw materials per unit of product, providing substantially uniform feed compositions, and the elimination of inert deadload materials often handled at great expense to avoid difficult concentration procedures.

The segregation or concentration of olefins from complex hydrocarbon mixtures has heretofore been so difficult and expensive that the comparative costs of concentration and of the use of available dilute stocks have often justified the latter course except where technically unfeasible.

The customary abundant sources of olefins of two to six or more carbon atoms are ordinarily highly complex mixtures of the paraffin and olefin isomers in varying proportions depending on the nature of the hydrocarbon raw material, the reactions responsible for olefin production, and any subsequent processing steps. Thus, the mixtures produced by dehydrogenation, cracking and such convertive reactions may contain varying proportions of paraffins, normal olefins and iso-olefins of the same or different number of carbon atoms. Fractional distillation may provide a preliminary separation into relatively narrow boiling range fractions of the same number of carbon atoms, but even these narrow fractions of $C_4$ and higher hydrocarbons may contain several compounds, with the olefins often present in minor amounts.

Other means of olefin concentration and recovery than fractional distillation include chemical separation and solvent extraction processes making use of complex formation and preferential solubility. Examples of these means are the absorption of unsaturates in solutions of cuprous and silver salts, and the extraction of olefins in selective solvents such as sulfur dioxide, liquid ammonia, and certain organic liquids. Such processes are often relatively efficient but are characterized by high operating and equipment costs which have heretofore limited application to especially high value products or to processes inoperative without high purity olefins.

It is an object of this invention to provide an improved process for the separation and recovery of olefins.

It is a further object of this invention to prepare olefin concentrates required for hydrocarbon synthesis and other olefin utilization processes.

Another object is to provide an improved process of catalytically cracking or dealkylating alkylated benzenes to olefins and benzene.

A still further object of this invention is to provide a more economical and efficient process for olefin recovery, generally applicable to olefin-containing mixtures from any source as an adjunct to processes wherein economic or technical benefits are derived from employing olefins in concentrated form and/or uniform composition.

I have now discovered a process for the segregation and recovery of olefin concentrates of an entirely new principle and scope. This process in its basic aspects comprises the following steps: (1) treatment of an olefin-containing predominantly aliphatic hydrocarbon mixture admixed with benzene over an alkylation catalyst to convert the olefins to alkyl side chains on the aromatic nucleus, (2) stripping the olefin-denuded aliphatic hydrocarbons from the aromatic hydrocarbon mixture, (3) fractionating the aromatic hydrocarbons to remove any excess of benzene, (4) treatment of the alkyl benzenes over a cracking catalyst to at least partially crack same and split off alkyl groups as olefins, (5) fractionating the cracked products to recover an olefin concentrate, and a mixture of benzene and alkyl benzenes which is recycled to the fractionation step (3) to obtain benzene for step (1) and uncracked alkyl benzenes for further treatment in step (4).

The operation of a specific embodiment of this process may be illustrated by reference to the drawing which is a flow diagram of suitable process equipment.

In the drawing, an olefin-containing feed stream entering through line 1 is mixed with benzene from line 2 and the mixture passes to alkylation zone 3 wherein the mixture is contacted with a catalyst capable of promoting substantially complete conversion of the olefin through alkylation of the benzene. The effluent from zone 3 then passes through line 4 to fractionator 5 wherein the olefin-denuded low-boiling hydrocarbons are stripped from the higher boiling mixture of benzene and alkyl benzenes and removed through line 6 for further utilization as desired.

The bottoms from column 5, consisting of alkylated benzenes and any excess of benzene, may be taken through line 7 to fractionating column 8 wherein the unreacted benzene is removed by fractionation through line 9 and thence recycled to benzene feed line 2. The alkylated benzenes then pass through line 10, heat exchanger 11, line 12, and heater 13, where sufficient heat is supplied to vaporize the stream and raise it to cracking temperatures. The heated vapors then pass to cracking zone 14 containing a cracking catalyst which is selective in cracking side chains from the aromatic nucleus. If desired, an inert diluent and/or heat carrier may be added at a suitable temperature from line 15 to the vapor charge to the cracking catalyst.

The cracked products then pass through heat exchanger 11 and via line 16 to fractionating column 17 wherein the low-boiling olefins are stripped from the aromatic hydrocarbons. The olefin stream representing a concentrate of the olefins in the original feed stream is removed through line 18 to associated processing equipment.

The bottom fraction from column 17 comprising uncracked alkylate and benzene then passes through line 19 to line 7 which is the feed line to column 8. In this latter column, benzene is removed and recycled as previously described to the alkylation step, while unconverted alkyl benzenes are returned with the products of the alkylation step for further treatment in the cracking zone.

An alternative operation consists of passing all or a portion of the benzene-alkyl benzene mixture from column 5 directly through line 20 to the cracking zone. This operation involves the handling of more benzene in the cracking zone as diluent and/or heat carrier. Benefits of this method of operation may depend on associated factors such as the benzene-olefin ratio in the feed to the alkylation step, the cracking catalyst and other economic considerations affecting process costs. In many cases, with high benzene-olefin ratios, preliminary fractionation will be highly desirable to reduce the size of the cracking and auxiliary equipment.

The operating conditions in each of the steps outlined above will vary with the particular olefin or olefinic mixture being concentrated, the original and final olefin concentrations, and the catalysts used in each of the catalytic treatments. Optimum conditions may, however, be determined experimentally for specific situations in the light of this disclosure and the non-limiting exemplary operations described hereinafter. The concentration and recovery of C₄ olefins is given emphasis because of the commercial importance of these compounds at the present time.

The alkylation treatment is preferably carried out in the presence of a catalyst active under mild temperature and pressure conditions, and which does not require extensive catalyst removal and/or hydrocarbon purification steps. While such conventional catalysts as sulfuric acid, phosphoric acid, aluminum chloride, zinc chloride, and the like may be used, it is often desirable to employ a catalyst from the group consisting of hydrofluoric acid, organic or inorganic complexes of boron trifluoride, particularly the boron fluoride-phosphoric acid complex, or solid contact catalysts consisting of synthetic silica gel activated with alumina and/or zirconia. These preferred catalysts may be employed so as to substantially completely strip olefins from even dilute mixtures with a minimum of sludge and polymer formation, and with substantially no formation of organic compounds of halogen, sulfur, or phosphorus, which contaminate the alkylate.

The olefin feed stock may be obtained from any suitable source such as petroleum cracking or dehydrogenation operations, and is often given a preliminary fractionation to segregate hydrocarbons of the same number of carbon atoms. Mixtures of olefins, say, propylene and C₄ olefins or C₄ and C₅ olefins may of course be used, but the optimum alkylation conditions may differ markedly so that process efficiency is decreased and olefin removal may be affected. A similar disadvantage may be encountered in the cracking step when treating alkyl benzenes with different side-chains although the handling of such mixtures is within the scope of the invention in its broader aspects.

The olefin-containing stocks employed as a charge to the present olefin recovery process are in many cases predominantly paraffin-olefin mixtures such as propane-propylene butane-butylene or pentane-amylene fractions produced by conventional methods such as fractional distillation or condensation. These stocks may also contain, in some cases, minor quantities of other components such as diolefinic and acetylenic hydrocarbons, which for most applications of the process to mono-olefin recovery are regarded as relatively undesirable impurites. The harmful effects of such impurities, and hence the amount which can be tolerated in process operation, will depend on the catalysts employed and the extent to which said impurities interfere with any or all of the process steps and/or appear as contaminants in the final olefin concentrate. In case process efficiency is seriously impaired, a preliminary operation for purification of the olefin-containing feed stock may be employed.

The olefin-containing feed is mixed with benzene in proportions favorable to complete olefin reaction in the presence of the specific catalyst employed. In most cases sufficient benzene is added to represent a molar benzene-olefin ratio greater than about 1:1 to insure a moderate excess of benzene in the alkylation zone. The provision of excess benzene may be utilized, if desired, to increase the proportion of mono-alkylate and/or to suppress the polymerization of some of the more reactive olefins. Such polymer formation is undesirable both because it represents a loss of olefin and because the separation steps utilizing fractional distillation may be greatly complicated. However, very large excesses of benzene are not usually necessary in the present process since the beneficial effects are ordinarily obtained with benzene-olefin ratios in the range of about 1:1 to about 10:1.

The benzene-olefin molar ratios are often of greatest importance when carrying out the alkylation of benzene with butylenes, amylenes, and higher olefins over silica-alumina type catalyst under conditions which may promote olefin polymerization. For example, when butylenes are converted to butylbenzenes over synthetic gel-type silica-alumina catalysts, temperatures of about 300 to about 450° F. are often preferred with pressures in the range of about 50 to about 500 pounds gage. Under these conditions, butylene polymerization is suppressed by using a relatively large excess of benzene in the alkylation zone. Suitable benzene-butylene molar ratios are often in the range of about 4:1 to about 10:1. With the lower olefins which are less readily polymerized, such provisions are of less importance.

In fact, when polymerization of the olefin is not a factor, the operation of the alkylation step may be carried out with a minimum quantity of benzene by permitting the formation of larger amounts of polyalkylated benzenes since the olefin recovery per mol of benzene used in alkylation is increased. This modification is ordinarily limited to the use of alkylation catalysts which do not form appreciable quantities of products higher than di-alkyl benzenes.

The temperature and pressure of alkylation will depend on the catalyst employed, as will the flow rate or contact time of hydrocarbons with the catalyst. Where possible the hydrocarbon stream is often maintained in liquid phase, although the lower-boiling olefins may be added as gases to benzene-liquid catalyst mixtures or passed in mixed phase with benzene over solid catalysts.

The reaction mixture from the alkylation zone is stripped or fractionated to remove the hydrocarbons originally associated with the olefins and this olefin-denuded stream may then be utilized elsewhere as, for example, for further conversion to olefins. The benzene and alkylated benzenes may then be fractionated to remove benzene which is available for recycle to the alkylation step. When this operation is carried out for maximum benzene recovery, the total quantity of benzene consumed in the process is held to a minimum. The fractionation equipment for the separation of benzene may serve for both the effluent from the alkylation zone and that from the cracking zone.

The alkylated benzenes are next sent to the cracking zone after being heated in one or more steps to attain the proper temperature. The cracking feed is contacted in vapor form with a catalyst which is highly specific in splitting off the alkyl side chain to produce an aliphatic olefin without extensive fragmentation of the original alkyl group. In this highly selective conversion, temperature, pressure, flow rate, and other reaction conditions are carefully chosen to produce maximum yields of the desired olefins and benzene which is in turn recycled for use in separation of additional olefins.

The reactions taking place in the cracking zone may be exemplified by the following equations:

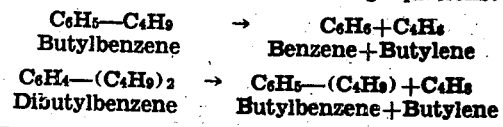

The second equation represents the probable course of reaction with polyalkylated benzenes, although the extent of this reaction and its effect on the reaction of the first equation will vary with the olefin involved.

The stability of the various alkyl benzenes in the cracking zone, or conversely, the ease with which alkyl side chains are split off from the aromatic nucleus varies with the length of the side chain so that optimum cracking conditions are somewhat different for each family of compounds. However, with the preferred cracking catalysts, satisfactory conversion of alkyl benzenes is usually obtained at temperatures in the range of about 700 to about 1100° F. In general, the minimum temperature is employed which will give satisfactory conversion over a specific catalyst. The benefits of employing said minimum temperatures include the reduced fragmentation or other conversion of the olefin after it is split off from the benzene nucleus and reduced heat requirements for the cracking step.

Pressures in the cracking step are usually maintained at low values to favor the cracking reaction and to suppress fragmentation, hydrogenation, polymerization, or other undesirable side reactions which may involve the relatively reactive olefins. In most cases low near-atmospheric pressures of about zero to about 100 pounds gage are satisfactory and maintain the flow of vapors through cracking and auxiliary equipment. Subatmospheric pressures may be employed although operational difficulties are usually increased.

Flow rates in the cracking operation are chosen to conform to temperature conditions in the interest of reaction efficiency at a reasonable per pass conversion. Thus, within limits, higher temperatures may require higher flow rates to suppress over-conversion with attendant coking of the catalyst and destruction of reaction products. Flow rates of about 1 to about 10 liquid volumes of alkyl benzene per volume of catalyst per hour are satisfactory in most cases.

While a number of recognized types of solid adsorbent cracking catalysts may be utilized in the present process, those most active and specific at moderate temperatures are certain silica-alumina compositions which may be considered the preferred catalysts. These silica-alumina catalysts are predominantly silica in highly adsorbent form, activated with minor amounts of alumina. Other metal oxides such as zirconia and titania may also be present in small amounts along with the silica and alumina. These catalysts are often synthetic preparations of the gel type formed by precipitation from suitable aqueous salt solutions by means known to the art, and carefully dried and activated to retain their structure and adsorbent characteristics.

Other types of silica-alumina catalysts may be prepared from naturally occurring minerals such as zeolites and clays by acid treatment to remove ferrous impurities and the like and to adjust the silica-alumina ratio, although such preparations are usually less active than the preferred catalysts and require higher cracking temperatures. Certain natural clays of low iron content are also usable without chemical treatment, although their activity is low compared to the preferred synthetic gel-type catalysts.

Bauxite, preferably of low iron content, is active in a somewhat higher temperature range than the synthetic silica-alumina catalysts, and while satisfactorily specific in the original splitting reaction, also, promotes a degree of rearrangement and branching of the carbon skeleton in C4 and higher olefins. This side reaction is useful in cases where the production of isobutylene, etc., is advantageous. Synthetic alumina preparations require still higher temperatures, and in the case of the higher olefins, produce somewhat more fragmentation of the olefin and light gas formation.

It is generally desirable to operate the cracking step at temperatures and reaction conditions which are least conducive to coke and carbon formation. This suppression of coking not only prolongs catalyst service between reactivations, but also reduces the production of hydrogen in the light gas formed during cracking. The latter effect is of great importance in further reducing the hydrogenation of olefins in the cracked products and in producing higher purity olefin products.

Coke formation and over-conversion at high temperatures may often be suppressed by the addition of a diluent to the feed stock to the cracking step. Such diluents are relatively inert at reaction conditions and should also be easily separable from the reaction products to avoid contamination of either olefin products or the recycled aromatic hydrocarbons. A preferred diluent is steam which may be added at the proper temperature level ahead of the catalyst and condensed from the reaction products in subsequent stages. Other possible materials include nitrogen, carbon dioxide, and methane, all of which are suitably inert and easily separable from all the olefins produced except perhaps ethylene.

When a catalyst becomes deactivated during use, reactivation is accomplished by burning off carbonaceous deposits to restore the original activity. Mixtures of air and inert gas are ordinarily employed for the reactivation step with the oxygen content controlled to prevent subjecting the catalyst to temperatures which impair the physical structure and the activity. In the reactivation of synthetic silica-alumina compositions, temperatures above about 1100° F. are usually avoided while with other catalysts such as bauxite and clay, somewhat higher temperatures up to about 1300° F. are permissible.

The following examples will serve to illustrate specifically the operation of the process, particularly with regard to specific alkylation catalysts and alkylation conditions and to specific cracking catalysts and products obtained in each step of the process. However, these examples are not to be considered as limitations of the process since a great many modifications and possible applications will be evident in view of the scope and teachings of this disclosure.

*Example I*

A refinery $C_4$ stream had the following approximate composition:

| | Volume per cent |
|---|---|
| Isobutylene | 0.5 |
| Isobutane | 36.5 |
| n-Butylenes | 9.0 |
| n-Butane | 54.0 |

The $C_4$ stream was admixed with sufficient benzene to produce a benzene-butylene molar ratio of 3:1 and the mixture was passed in liquid phase into a turboreactor containing boron fluoride-phosphoric acid complex catalyst. The hydrocarbon remained in contact with the catalyst 20 minutes at 100° F. and a pressure sufficient to prevent vaporization. The hydrocarbon layer was then withdrawn, settled free of catalyst, and fractionated to remove $C_4$ hydrocarbons. The $C_4$ residue removed contained less than 0.2 volume per cent of olefins.

The benzene-butylbenzene bottoms fraction was again fractionated to recover unreacted benzene, and the total alkylate consisting of 90 weight per cent monobutylbenzene and 10 weight per cent of dibutylbenzene was vaporized and charged to a synthetic silica-alumina catalyst at a temperature of 760° F., 5 pounds gage pressure, and a flow rate of 4.0 liquid volumes of charge per volume of catalyst per hour. The approximate catalyst composition was 98.5 per cent silica and 1.5 per cent alumina.

The conversion per pass to benzene and light hydrocarbons was about 60 per cent by weight of the butylbenzenes charged. Cracked products were fractionated to recover light hydrocarbons, benzene, and butylbenzenes. The composition of the cracked products was as follows:

| | Weight per cent |
|---|---|
| Light hydrocarbons ($C_3$ and $C_4$) | 26.9 |
| Benzene | 32.8 |
| Butylbenzene | 36.1 |
| Dibutylbenzene | 4.2 |

The light hydrocarbon fraction had the following composition:

| | Volume per cent |
|---|---|
| $C_2$ and lighter | zero |
| Propylene | 3.5 |
| Isobutylene | 5.5 |
| Isobutane | 5.9 |
| n-Butylenes | 83.0 |
| n-Butane | 2.1 |

The yield of $C_4$ hydrocarbons based on the weight of butylbenzenes converted was about 98 per cent of the theoretical yield, and the net concentration of butylenes was from 9.5 volume per cent in the $C_4$ charge to about 91.5 volume per cent in the olefin concentrate.

When cracking the same butylbenzene stock at 800° F. over the same catalyst and with the addition of 3 mols of steam per mol of butylbenzenes, the per pass conversion at a flow rate of one liquid volume of hydrocarbon per volume of catalyst per hour was 85 weight per cent of the charge. Benzene recovery was substantially complete and the olefin concentrate had the following composition:

| | Volume per cent |
|---|---|
| Propylene | 3.1 |
| Isobutylene | 9.7 |
| n-Butylenes | 82.5 |
| Isobutane | 4.7 |

The steam diluent involved operation at a higher temperature and shorter contact time but with higher conversion per pass and higher unsaturation in the $C_4$ hydrocarbon products.

*Example II*

A $C_5$ stock containing 25 volume per cent of pentenes, principally pentene-2 and pentene-1, was mixed with benzene in a benzene-olefin molar ratio of 4:1 and the mixture was contacted with boron fluoride-phosphoric catalyst. At a flow rate corresponding to 15 minutes contact with the catalyst and at a temperature of 120° F., complete reaction of the pentenes was obtained. After fractionation to remove pentanes and unreacted benzene, the mono-amyl benzenes were segregated and cracked over silica-alumina catalyst similar to that used in Example I at atmospheric pressure and 750° F. The flow rate was 1.85 liquid volumes amyl benzene per volume of catalyst per hour, and per pass conversion of amyl benzene was 45 weight per cent. The cracked products contained a substantially theoretical yield of benzene and light hydrocarbons lower-boiling than pentenes equal to about 3 weight per cent of the amyl benzene charge. The C₅ fraction after removal of C₄ and lighter hydrocarbons was about 95 per cent unsaturated.

*Example III*

A C₃ fraction containing 23 per cent propylene was mixed with benzene in a molar benzene-propylene ratio of 2:1 and passed over a synthetic silica-alumina gel type catalyst at 375° F. and 400 pounds gage pressure. The propylene was completely reacted to form mono- and di-isopropylbenzene. After separation of propane and benzene from the alkylate by fractionation, the propylbenzenes were cracked over silica-alumina catalyst at 800° F., atmospheric pressure, and a flow rate of two liquid volumes of alkylate per volume of catalyst per hour. The conversion per pass was about 80 weight per cent of the propylbenzenes charged. The cracked products included a C₃ fraction containing 92 per cent propylene. Benzene recovery corresponded closely to theoretical values.

*Example IV*

A butane-butylene fraction containing 18 volume per cent butylene and 82 volume per cent butanes was admixed with sufficient benzene to produce a molar benzene-butylene ratio of about 6:1 and the mixture was passed in liquid phase at 325° F. and 200 pounds gage pressure over synthetic silica-alumina gel catalyst. At a flow rate of 1.5 liquid volumes of charge per volume of catalyst per hour the butylenes were substantially completely reacted with formation of butylbenzenes. The excess of benzene was employed to effectively suppress butylene polymerization.

Butanes, benzene, and material lower boiling than butylbenzene were separated from the alkylate by fractionation, the butanes being removed from the system while the benzene fraction was recycled to the alkylation catalyst.

The butylbenzene was cracked by passage at 760° F. over a catalyst similar to that employed in the alkylation step. The pressure was sufficiently higher than atmospheric to maintain vapor flow and the flow rate was 3.0 liquid volumes of charge per volume of catalyst per hour. Per pass conversion of butylbenzenes to benzene and light hydrocarbons was 80 per cent by weight of the charge. The recovered C₄ fraction had the following composition:

| | Volume per cent |
|---|---|
| Isobutylene | 7.8 |
| n-Butylenes | 87.2 |
| Butanes | 5.0 |

*Example V*

The butylbenzene stock obtained by alkylation as described in Example IV was cracked by passage over bauxite catalyst at 1000° F. The hydrocarbon charge was diluted with steam in a molar ratio of 1:4 and passed over the catalyst at a flow rate of one liquid volume of hydrocarbon per volume of catalyst per hour at a pressure of 15 pounds gage. The per pass conversion was 27 weight per cent of the charge and the olefin concentrate produced had the following composition:

| | Volume per cent |
|---|---|
| C₃ | 1.8 |
| Isobutylene | 15.0 |
| n-Butylenes | 81.1 |
| Butanes | 2.1 |

*Example VI*

The butylbenzene stock of Example IV was cracked over Attapulgus clay (low-iron fuller's earth) at 1000° F. Steam diluent was used with a hydrocarbon-steam mol ratio of 1:5. The hydrocarbon flow rate was one liquid volume of charge per volume of catalyst per hour. Per pass conversion was 44 per cent of the charge and the olefin concentrate had the following composition:

| | Volume per cent |
|---|---|
| C₃ | 1.3 |
| Isobutylene | 6.3 |
| n-Butylene | 90.7 |
| Butanes | 1.7 |

The efficiency of the disclosed process with regard to product recovery and to utilization of the benzene which in a sense is an olefin carrier or concentration reagent will be evident to those skilled in the art to which this invention relates. Also, many useful applications of the present process will be suggested, whereby the process becomes an integral part of one or more processes for hydrocarbon conversion, purification, and/or synthesis.

Thus, the process of this invention may be employed in connection with operations such as the polymerization of olefins to valuable higher-boiling products or the alkylation of isoparaffins with olefins to form high octane isoparaffin blending agents. Similarly, the process may be utilized to prepare high purity olefin feed stocks for conversion to diolefins by dehydrogenation or for conversion to alcohols, halogenated derivatives, and the like. It is of particular value in the recovery of olefins from catalytic dehydrogenation processes, by reason of the substantially complete recovery of the olefin products and the preparation of a suitable olefin-denuded paraffin recycle stock for the catalytic dehydrogenation step.

Having thus disclosed my invention, I claim:

1. A process for the separation and recovery of butylenes in concentrated form from butylene-containing mixtures which comprises admixing said butylene-containing mixture with benzene to produce a benzene-butylene molar ratio greater than about 1:1, treating the resulting mixture over a synthetic gel type catalyst comprising silica gel activated with a minor proportion of alumina at temperatures in the range of about 300 to about 450° F. and pressures of about 50 to about 500 pounds gage, whereby the butylenes are substantially all converted to butylbenzenes, substantially completely separating unreacted components of the butylene-containing mixture and unreacted benzene from the alkylation reaction products, passing the alkylate so produced over a cracking catalyst comprising a synthetic gel type catalyst which is predominantly silica in highly adsorbent form activated with minor amounts of alumina at temperatures in the range of about 700 to about 1000° F. and pressures in the range of about zero to 100 pounds gage, whereby the butylbenzenes are partially converted to butylenes and benzene as the principal reaction products, recovering a butylene concentrate from the products of the cracking reaction, and returning benzene to the alkylation step and unconverted butylbenzenes to the cracking step.

2. A process for the separation and recovery of low-boiling C₃ to C₅ aliphatic olefins in concentrated form from hydrocarbon mixtures containing a minor proportion of said olefins in admixture with a major proportion of close-boiling paraffins which comprises admixing said mixture with benzene in such proportions as to give a benzene-olefin molar ratio greater than about 1:1, treating the resulting mixture with an alkylation catalyst under such conditions that substantially all of the olefins contained in said hydrocarbon mixture are reacted with the benzene and converted to alkyl side chains on the benzene nucleus, substantially completely separating unreacted components of said hydrocarbon mixture and unreacted benzene from the alkylation reaction products, treating the alkylate so produced in the absence of benzene with a cracking catalyst consisting of synthetic silica-alumina gel at temperatures of 700 to 1000° F. and under conditions such that dealkylation of said alkylate to benzene and said olefins is the principal reaction occurring, and recovering from the cracking effluent said olefins in concentrated form.

3. A process for the separation and recovery of low-boiling C₃ to C₅ aliphatic olefins in concentrated form from hydrocarbon mixtures containing a minor proportion of said olefins in admixture with a major proportion of close-boiling paraffins which comprises admixing said hydrocarbon mixture with benzene in such proportions as to give a benzene-olefin molar ratio greater than about 1:1, treating the resulting mixture over a synthetic gel type catalyst comprising silica gel activated with a minor proportion of alumina at temperatures in the range of about 300 to about 450° F. and pressures of about 50 to about 500 pounds gage, whereby said olefins are substantially all converted to the corresponding alkylbenzenes, substantially completely separating unreacted components of said hydrocarbon mixture and unreacted benzene from the alkylation reaction products, passing the alkylate so produced over a cracking catalyst comprising a synthetic gel type catalyst which is predominately silica in highly adsorbent form activated with minor amounts of alumina at temperatures in the range of about 700 to about 1000° F. and pressures in the range of about zero to 100 pounds gage, whereby the alkylbenzenes are converted to said olefins and benzene as the principal reaction products, recovering an olefin concentrate from the products of the cracking reaction, and returning benzene to the alkylation step and unconverted alkylbenzenes to the cracking step.

4. A process for the separation and recovery of propylene in concentrated form from propylene-containing mixtures which comprises admixing said propylene-containing mixture with benzene to produce a benzene-propylene molar ratio greater than about 1:1, treating the resulting mixture over a synthetic gel type catalyst comprising silica gel activated with a minor proportion of alumina at temperatures in the range of about 300 to about 450° F. and pressures of about 50 to about 500 pounds gage, whereby the propylene is substantially all converted to propylbenzenes, substantially completely separating unreacted components of the propylene-containing mixture and unreacted benzene from the alkylation reaction products, passing the alkylate so produced over a cracking catalyst comprising a synthetic gel type catalyst which is predominantly silica in highly adsorbent form activated with minor amounts of alumina at temperatures in the range of about 700 to about 1000° F. and pressures in the range of about zero to 100 pounds gage, whereby the propylbenzenes are partially converted to propylene and benzene as the principal reaction products, recovering a propylene concentrate from the products of the cracking reaction, and returning benzene to the alkylation step and unconverted propylbenzenes to the cracking step.

5. A process for the separation and recovery of amylenes in concentrated form from amylene-containing mixtures which comprises admixing said amylene-containing mixture with benzene to produce a benzene-amylene molar ratio greater than about 1:1, treating the resulting mixture over a synthetic gel type catalyst comprising silica gel activated with a minor proportion of alumina at temperatures in the range of about 300 to about 450° F. and pressures of about 50 to about 500 pounds gage, whereby the amylenes are substantially all converted to amylbenzenes, substantially completely separating unreacted components of the amylene-containing mixture and unreacted benzene from the alkylation reaction products, passing the alkylate so produced over a cracking catalyst comprising a synthetic gel type catalyst which is predominantly silica in highly adsorbent form activated with minor amounts of alumina at temperatures in the range of about 700 to about 1000° F. and pressures in the range of about zero to 100 pounds gage, whereby the amylbenzenes are partially converted to amylenes and benzene as the principal reaction products, recovering an amylene concentrate from the products of the cracking reaction, and returning benzene to the alkylation step and unconverted amylbenzenes to the cracking step.

WALTER A. SCHULZE.